United States Patent Office 3,316,242
Patented Apr. 25, 1967

3,316,242
GALACTURONIC ACID SALTS USEFUL IN THE TREATMENT OF DIARRHEAL AND DERMATOLOGIC DISEASES
Ernest J. Sasmor, Yonkers, N.Y., assignor to The Purdue Frederick Company, New York, N.Y., a corporation of New York
No Drawing. Filed Feb. 14, 1963, Ser. No. 258,613
7 Claims. (Cl. 260—209.5)

The present invention relates to a new and novel salt of polygalacturonic acid which is useful for therapeutic purposes, the means of preparing the same and the incorporation into dosage forms of the acid salt for administration to humans and animals. In particular, it is concerned with N-methyl glucammonium polygalacturonate, its method of synthesis and its use together with a pharmaceutically acceptable carrier for the treatment of diarrheal disease and dermatologic inflammatory diseases.

The occurrence of the diarrheal state is commonly observed in the everyday practice of medicine. Many organic digestive tract diseases, as well as those due to functional causes of a non-organic nature, have been associated with diarrhea. Food allergy also has been identified with chronic non-inflammatory diarrhea and particularly when the allergin is a constituent of such protein-containing foods as eggs, rye, wheat and milk.

While transitory episodes of diarrhea do not impose a threat to the life of the individual, these episodes are extremely incapacitating and very often debilitating. In the case of an infant, episodes of diarrhea may, in fact, be a contributing cause of infant death. While transitory episodes of diarrhea are self-limiting, these are often the first presenting symptom of more serious underlying gastrointestinal disease. For example, the gastrointestinal infections of amoebic dysentery and bacillary dysentery, are usually identified by the onset of diarrhea from which the causative organism may be cultured. Prompt institution of therapy will generally control the disease, whereas delay in the application of therapeutic measures may result in the formation of encapsulations, complicating the therapy of these diseases.

From the viewpoint of the traveler in the tropic and sub-tropic countries, as well as in areas where refrigeration is sparse, the occurrence of diarrheal disease is high and presents serious problems to both the individual and community health. Chronic diarrhea, as a result of the more serious underlying pathologic state, requires prompt corrective measures, in order that therapy be directed at the underlying cause. Among the infant and aged population, the persistence of the diarrheal state has resulted in dehydration and debilitation and has been shown to be a cause of infant death.

There are three basic goals to the treatment of diarrhea:
(a) The prompt control of hyperperistalsis and the relief of abdominal discomfort;
(b) Maintenance of a proper nutritional balance;
(c) The inhibition of possible gastrointestinal pathogens without jeopardizing the status of the normal gastrointestinal flora.

Of the many drugs which have been used in the therapy of diarrhea, the opiates, the hydrophilic gums, the insoluble bulking chemical compounds such as bismuth salts and kaolin, and the cholinergic depressants have been most commonly employed. While the rationale for the use of these agents is pharmacologically sound, the clinical use has resulted in the occurrence of serious side reactions, incidental to the therapy of the diarrhea, which present a threat to the patient. Thus, we find that opium and the opiate derivatives have been employed for centuries in the control of diarrhea, but that the threat of narcotic addiction and the severe general depressed state following the use of these hypnotic substances, limits this class of compounds for routine use. The use of hydrophilic vegetable gums is predicated upon their ability to absorb and retain fluids and, therefore, provide a bulking action to reduce the fecal fluidity and thereby minimizing the number of bowel movements. In addition to the fluid-retaining properties of the gums, the question of adsorptive detoxification has been raised in connection with these substances. The limitations of the hydrophilic gums is apparent when it is recognized that they are administered in solution. Thus, their hydrating properties approach saturation from the onset and consequently further fluid will serve only to dilute and depress the hydrophilic character rather than to enhance absorption. This is contrary to the desired pharmacologic effect. Since these gums are generally polymeric glycose colloids, they are capable of undergoing enzymatic digestion, thus further reducing their ability to retard the diarrheal state.

Metallic bulking substances, such as insoluble bismuth salts and kaolin, act by providing an insoluble palpable powder to the liquid stool, thereby forming a bulk and also as colloid adsorptive substances. While these agents have some measure of therapeutic efficacy due to their colloidal adsorptive properties, this capacity is limited and, furthermore, is subject to wide dosage variation during their administration because of sedimentation and precipitation. The adsorptive properties are further limited by contact with the enzymatic substrates found in the gastrointestinal tract, so that when these compounds reach the affected site, adsorptive saturation has frequently occurred.

Cholinergic depressants are non-selective in nature and exert their effect throughout the entire body. Thus, in order to achieve a proper peristaltic inhibitory action, general depression of the cholinergic system must necessarily occur with the consequent development of dry mouth, pupillary reactions and cardiac acceleration, as a course of the pharmacology of the drug. Furthermore, cholinergic depressants, as a class, are contraindicated for the geriatric patient, subject to glaucoma, since this class of drugs have been shown to be a precipitating cause of glaucoma.

Thus, the treatment of diarrhea, over the centuries, has resulted in the use of therapeutic agents selected first to inhibit the hyperneuroperistaltic activity as, for example, the opiates and the cholinergic depressants, or to effect the fluidity of the fecal contents as, for example, the hydrophilic vegetable gums and the insoluble metallic compounds. These therapies have been found wanting and the control of the diarrheal state remains a serious problem to present day medical practice.

Colloidal agents are well known to the treatment of inflammatory skin disease, being used principally as wet applications for their calmative action on the skin. A major use of colloids has been in the form of a soak or a bath preparation which is indicated for all forms of contact dermatitis, both as a soothing measure as well as a means of cleansing. The most commonly employed colloids for this purpose are the natural starches, consisting either of the long-chain linear polymers as for example, amylose, or the complex branched chain polymers as, for example, amylopectins. These substances are used by adding the starch to the bath water whereupon dispersion is achieved as a colloidal sol. The patient immerses either the entire body or the affected organ, into this colloidal solution for varying periods of time and then the skin is dried to leave a film of the colloid as a soothing protectant.

The viscosity of the solution contributes to the film-forming properties of the solution, and to the blandness and soothing properties of the colloidal sol. The ultimate utility, therefore, is dependent upon its general physical and chemical characteristics.

Native starches consist largely of amylopectins with a molecular weight ranging from 45,000 to 180,000. Starch granules are insoluble in water, but swell as water is absorbed by the mass. The high apparent viscosity of the starch solution is largely due to the swollen granules, in contact with one another, and thus upon severe agitation as, for example, that produced by a mechanical blender, will disrupt the system so that the overall viscosity of the starch suspension is reduced to only a few percent of its original value. From the viewpoint of true viscolizing properties as a means of influencing film formation, starch is commonly considered as not a suitable agent.

In atopic dermatitis and puritic manifestations, colloidal baths are most desirable for cleansing and sedating the skin during a generalized acute or subacute dermatitis. This is particularly so if there is exudation and crusting. Moist compresses of colloidal sols have been found to be effective during localized acute inflammatory skin disease, as might be present in eczema or where exudates and crusting has occurred. The literature also notes caution where the dermatitis is on an allergic basis, that care be exercised so that the colloidal system does not contribute to the exacerbation of the allergenic response.

The major limitation of the amylopectin type of colloidal bath results from the inherently poor film-forming properties, unstable viscosity and potentially sensitizing characteristics.

In contrast to the limitations of the older therapies used in the treatment of both the diarrheal state and in dermatology, the product of the present invention provides a new and novel approach to these problems without super-imposing unwanted pharmacologic side reactions. N-methylglucammonium polygalacturonate is non-toxic and non-sensitizing and provides a stable colloidal sol, having good film-forming properties.

N-methylglucammonium polygalacturonate is a new and novel salt obtained from the interreaction of N-methyl glucamine and polygalacturonic acid. Polygalacturonic acid is a derivative of pectin having properties which are chemically and physically different from the parent compound. Essentially polygalacturonic acid is a demethoxylated compound consisting of a polymer composed of anhydro galacturonic acid units, which is insoluble in water.

N-methyl glucammonium polygalacturonate is obtained thru the interreaction of N-methyl glucamine and polygalacturonic acid in an inert solvent. An optimal method of synthesis is to cause to react approximately equal weights of the two reagents, utilizing water or alcohol as a solvent. In carrying out this reaction, it is first necessary to determine the available carboxyl content of the polygalacturonic acid reagent. This is determined by alkali titration. The carboxyl group number or acid-value determined for the specific polymer is then utilized as a means of calculating the amount of N-methyl glucamine required to cause complete reaction. Generally, it will be found that the range in available carboxyl groups will be not less than 85 percent.

N-methyl glucammonium polygalacturonate has a molecular weight of 371.2, and is soluble in water, but is insoluble in ether and acetone. The compound has a melting point of 208–211° C., and the pH of a 1 percent aqueous solution is pH 7.1.

On elemental analysis of N-methyl glucammonium polygalacturonate, prepared according to the methods of the present invention, the following values were obtained:
Theory, percent: C, 42.048; H, 6.738; N, 3.773. Found, percent: C, 41.79; H, 6.94; N, 3.50.

When N-methylglucammonium polygalacturonate is dispersed in water, it forms a stable colloidal solution which is capable of exerting a protective demulcent action to the gastrointestinal tract after oral administration as well as a calmative demulcent action to the skin when applied topically. When it is desired to use N-methylglucammonium polygalacturonate in therapy, it may be administered either as a liquid colloidal solution as, for example, a flavored, aromatic syrup or an aqueous or hydroalcoholic solution, or as a solid dosage form as, for example, tablets, capsules, powders or granules. The range in dosage of N-methylglucammonium polygalacturonate is from 50 mg. to 2 gm. per unit dose, which may be administered from 1 to 12 times daily, depending upon the individual patient needs.

When N-methylglucammonium polygalacturonate is intended for use in providing a colloidal demulcent effect to the skin, then it may be applied as a wet dressing, a soak or a colloidal bath. When used as a wet dressing, a solution of from 5 percent to 15 percent concentration of N-methylglucammonium polygalacturonate, dissolved in water, is used. While the pH of this solution is approximately neutral, it may be preferred within the pH range of from pH 5.5 to pH 7.5. The solution of N-methylglucammonium polygalacturonate is then poured over an absorbent cotton dressing in contact with the affected area. The solution is replaced as often as necessary and the moist compress is allowed to remain in contact with the irritated skin for varying periods, depending upon the individual patient's requirements. The treatment may be repeated as often as is required.

When used as a soak, the affected portion of the body is immersed in a 5 to 25 percent aqueous solution of N-methylglucammonium polygalacturonate and the solution is maintained at a temperature of from 40° C. to 50° C. for periods of from 20 to 40 minutes, which may be repeated as often as is required.

When N-methylglucammonium polygalacturonate is used as a colloidal bath, the active ingredient is added to the bath water to result in a concentration of 1 cup of N-methylglucammonium polygalacturonate for each 8 inches of bath water. When all of the solid material has gone into solution, the body is immersed in the bath water and afterwards the skin is patted dry, without rinsing.

The following examples illustrate the scope of this invention:

Example 1

The exact reaction weight equivalent of the polymer is determined by titration with N/10 sodium hydroxide solution. This titration determines the anhydro-galacturonic acid content of the polygalacturonic acid polymer, which is available for chemical reaction. Since polygalacturonic acid is obtained from botanical sources, the individual polymer may vary in anhydro-galacturonic acid content within the limits of not less than 85 percent anhydro-galacturonic acid content and not more than 100 percent anhydro-galacturonic acid content, on an anhydrous basis. The factor used to determine the anhydro-galacturonic acid content is 176. After determining the anhydro-galacturonic acid content for the particular polymer used, all reacting weights are referable to this value.

In a reaction vessel, 1660 gm. of polygalacturonic acid, having an anhydro-galacturonic acid value of at least 85 percent, are mixed with 11.6 liters of distilled water and the temperature raised to 50° C.

In a separate reaction vessel, 1593 gm. of N-methylglucamine is dissolved in 8 liters of hot, distilled water. When solution is complete, 80 gm. of charcoal are added and the mixture stirred for approximately 20 minutes while the temperature is maintained at about 50° C. The mixture is then filtered and the clear filtrate cooled to room temperature. The N-methylglucamine solution is then added slowly to the aqueous dispersion of polygalacturonic acid under constant stirring. The stirring is continued until complete solution is achieved while the mixture is warmed to a temperature of between 60° C. and 80° C. To this solution is then added 80 gm. of charcoal and the stirring continued for another 20 minutes, after which time it is filtered through a prepared filter bed of kaolin. The filtrate is then set aside to cool overnight. The next morning this solution is poured into a vessel containing 5 liters of methanol and allowed to precipitate. An amorphous precipitate material is obtained which is separated, pressed dry and dried in a vacuum oven. The dried powder is then passed through a sieve of No. 16 mesh porosity. The powder is then dissolved in hot, distilled water, utilizing a volume of 3 parts solvent for each part solid powder. This solution is then precipitated with two volumes of methanol. The precipitate material is cooled, dried and ground to a #60 mesh powder and is N-methylglucammonium polygalacturonate.

N-methylglucammonium polygalacturonate has a melting point of 208°–211° C. and is soluble in water, but insoluble in ethanol, acetone and ether. The pH of a 1 percent aqueous solution is pH 7.1, and upon elemental analysis, shows good agreement with the theoretical values.

Theory, percent: C, 42.048; H, 6.738; N, 3.773. Found, percent: C, 41.79; H, 6.94; N, 3.50.

*Example 2*

To a dispersion of 180 gm. of polygalacturonic acid in 2 liters of distilled water, is added 40 gm. of sodium hydroxide dissolved in 1 liter of distilled water, and the mixture stirred until solution is achieved. To this is then added a solution of 231 gm. of N-methylglucamine hydrochloride, dissolved in 1 liter of distilled water. The mixture is stirred while the temperature of the solution is raised to 60° C., and this is maintained for 4 hours. At the end of this time, the solution is poured into an equal volume of cold methanol and the precipitate collected. The precipitated material is then dissolved in one liter of distilled water, which is warmed to achieve complete solution and then is re-precipitated by the addition of 3 volumes of methanol. The solid material is separated and dried. The resulting material is N-methylglucammonium polygalacturonate conforming, in every respect, with that obtained from Example 1, above.

*Example 3*

In place of the methanol described in Examples 1 and 2, above, there may be substituted, in equal proportions, any liquid alkanol of from 2 through 6 carbons.

*Example 4*

When it is desired to utilize N-methylglucammonium polygalacturonate in therapy of diarrheal disease, then this compound may be administered in the form of powders, granules, capsules and tablets.

In preparing a powder of internal administration, it is necessary that a pharmaceutically acceptable diluent be utilized for more accurate dosage administration. Pharmaceutically acceptable diluents such as beta-lactose, starch, dextrose or sucrose may be used in a ratio of from 1 part active ingredient to 1/10 part diluent, to 1 part of active ingredient to 10 parts of diluent. It will be found that a preferred ratio is equal parts of active ingredient and diluent.

In preparing the powder, the appropriate concentration of each ingredient is weighed out and then carefully blended. In order to achieve an intimate mixture, the solid particles should be wetted with a granulating solution consisting of 50 percent ethanol-water and passed through a #80 mesh sieve and dried. The uniform particle size thus obtained facilitates accurate dosage administration.

When it is desired to utilize granules as the dosage form for oral administration, then a mixture of equal parts of N-methylglucammonium polygalacturonate and a pharmaceutically acceptable diluent as, for example, lactose, corn starch or potato starch, are mixed and wetted with a granulating solution consisting of 2 percent gum acacia or 2 percent gum tragacanth, and passed through a No. 40 mesh sieve and dried. The dried particles are then mixed with an equal weight of sucrose and to this is added 1/10 percent magnesium stearate, and the mixture wetted with ethanol-water, the wet mass passed through a No. 8 mesh sieve and dried. The dried granules are then packaged in suitable containers.

When it is desired to utilize capsules as the dosage form for administration, then these may be prepared by directly filling the active ingredient, N-methylglucammonium polygalacturonate, into gelatin capsules of suitable size and shape. It may be preferred to utilize a pharmaceutically acceptable diluent as well as a lubricant to facilitate the capsulating process. If this is desired, then a pharmaceutically acceptable diluent, such as lactose, sucrose, or corn starch, may be used and a lubricant such as stearic acid or magnesium stearate added to the mixture. The ratio of active ingredient to diluent in the preparation of capsules is from 0.1 part through 5 parts of active ingredient for each part of diluent. From 0.05 part to 0.5 part of lubricant is added for each part of whole mixture of diluent and active ingredient.

In order to prepare tablets of N-methylglucammonium polygalacturonate, it is necessary to prepare a tablet granulation consisting of 1 part active ingredient and ½ part of a diluent such as lactose, sucrose or corn starch. To this mixture is added a small amount of magnesium stearate as, for example, 1/10 part, and the whole mass moistened with a solution of 2 percent gum acacia, passed through a No. 60 mesh sieve, and dried. The dried granulation is then compressed into tablets of suitable size and shape.

When N-methylglucammonium polygalacturonate is administered by the oral route, in the dosage form of either powder, granules, capsule or tablet, the same range in unit dosage administration is utilized. This is achieved by appropriate adjustment of the ratio of active ingredient to the diluent. The unit dose of the powder or granules may be either 1 teaspoon or 1 tablespoonful, and one capsule and one tablet is the unit dose for these dosage forms. The range in concentration of active ingredient of each unit dosage form is from 50 mg. to 2 gm., per unit dose. The unit dosage of N-methylglucammonium polygalacturonate may be administered from 1 to 12 times daily, depending upon the individual patient needs.

*Example 5*

When it is desired to utilize a liquid dosage form for the administration of N-methylglucammonium polygalacturonate, then such may be prepared by dissolving a sufficient quantity of N-methylglucammonium polygalacturonate in a pharmaceutically acceptable aqueous, or hydroalcoholic solvent as, for example, 10 percent alcohol-water mixture, so that each teaspoonful (5 cc.) contains from 50 mg. to 2 gm. per unit dose. If it is desired to utilize a tablespoonful (15 cc.) as the unit dose, then an appropriate adjustment in the ratio of active ingredient to diluent is made so that the range in concentration of active material, per tablespoon dose, is from 50 mg. to 2 gm. Suitable flavoring and sweetening agents may be added, as desired. Liquid pharmaceutical preparations of N-methylglucammonium polygalacturonate may be administered from 1 to 12 times daily.

*Example 6*

When it is desired to utilize N-methylglucammonium polygalacturonate in the therapy of inflamed skin, as for example, atopic dermatitis, allergic dermatitis or eczema, as well as for any other dermatologic disease characterized by inflamed skin, then the compound may be applied in the form of a wet dressing, a soak, or a colloid bath. In order to prepare a wet dressing of N-methylglucammonium polygalacturonate, a solution of from 5 to 25 percent of N-methylglucammonium polygalacturonate, in distilled water, is prepared and this is poured directly onto a cotton covering, over the affected area. Should it be desired to buffer the solution or to adjust the pH of the solution so that it ranges from pH 5.5 to pH 7.5, then small amounts of acetic acid may be utilized to achieve this. The cloth covering is kept moistened with the N-methylglucammonium polygalacturonate solution and this wet dressing is kept in contact with the inflamed skin for varying periods depending upon the individual patient's requirements.

When a soak is desired, then a solution consisting of from 5 to 25 percent of N-methylglucammonium polygalacturonate, with a preferred concentration of 10 percent, is prepared. The soak solution is maintained at a temperature of between 40 and 50° C. and the affected organ is immersed therein for periods of from 20 to 40 minutes, which is repeated as often as is indicated.

When a colloid bath is desired, as a means of applying N-methylglucammonium polygalacturonate to the skin surface, then this is achieved by dissolving 1 cup of N-methylglucammonium polygalacturonate powder for each 8 inches of bath water. In order to achieve an optimal rate of solution, the particle size of the N-methylglucammonium polygalacturonate is not greater than #100 mesh size.

The body is then immersed in this bath solution for varying periods of time and is then patted dry. A thin film of N-methylglucammonium polygalacturonate remains on the skin to exert a continued demulcent effect.

*Example 7*

In place of the N-methylglucamine hydrochloride described in Example 2, there may be substituted, in equal molecular proportions, N-methylglucamine chloride, N-methylglucamine bromide, N-methylglucamine hydrobromide, N-methylglucamine iodide, N-methylglucamine sulfate, N-methylglucamine nitrate, N-methylglucamine acetate, N-methylglucamine succinate and N-methylglucamine tartrate, the remainder of the steps being the same and the resultant product obtained is N-methylglucammonium polygalacturonate.

*Example 8*

In place of the sodium hydroxide described in Example 2, there may be substituted, in equal molecular quantities, sodium carbonate, sodium bicarbonate, potassium hydroxide, potassium carbonate, potassium bicarbonate, calcium hydroxide, calcium carbonate, calcium bicarbonate, magnesium hydroxide, magnesium carbonate, magnesium bicarbonate, aluminum hydroxide, aluminum carbonate, lead carbonate, lead oxide, silver nitrate and silver oxide. The remainder of the steps being the same the resultant product obtained is N-methylglucammonium polygalacturonate.

What is claimed is:

1. The compound N-methylglucammonium polygalacturonate which is a tan to white powder, soluble in water, insoluble in organic solvents, which melts substantially at 208–211° C., and a 1 percent aqueous solution of which has a pH of about 7.1.

2. The method of preparing N-methylglucammonium polygalacturonate comprising the steps of determining the alkali titration equivalent of polygalacturonic acid, adding a stoichiometric equivalent of N-methylglucammonium ion to the aqueous dispersion of polygalacturonic acid, said N-methylglucammonium ion being dissolved in a solvent selected from the group consisting of water or hydroalcoholic solution, said hydroalcoholic solution consisting of water and containing not more than 10 percent ethanol, stirring the mixture until complete solution is achieved, warming to a temperature of between 60° and 80° C., filtering, cooling the filtrate, pouring the filtrate into a liquid alkanol of from 1 to 6 carbons in chain length, stirring, collecting and drying precipitate powder, redissolving precipitate powder in hot distilled water, adding two volumes of a liquid alkanol having from 1 through 6 carbons in chain length and recovering N-methylglucammonium polygalacturonate therefrom.

3. The method of preparing N-methylglucammonium polygalacturonate which comprises the steps of adding an aqueous solution of an acid salt of N-methylglucamine to an aqueous solution of a metal salt of polygalacturonic acid stirring and warming to 60° C., pouring into a liquid alkanol of from 1 to 6 carbons in chain length, cooling the precipitate, redissolving said precipitate in distilled water, reprecipitating by the addition of a liquid alkanol of from 1 through 6 carbons in chain length and recovering N-methylglucammonium polygalacturonate therefrom.

4. The method of preparing N-methylglucammonium polygalacturonate as described in claim 3, said acid salt of N-methylglucamine being selected from the group consisting of N-methylglucamine chloride, N-methylglucamine hydrochloride, N-methylglucamine bromide, N-methylglucamine hydrobromide, N-methylglucamine iodide, N-methylglucamine sulfate, N-methylglucamine nitrate, N-methylglucamine acetate, N-methylglucamine succinate and N-methylglucamine tartrate and said metal salt of polygalacturonic acid being selected from the group consisting of sodium polygalacturonate, potassium polygalacturonate, magnesium polygalacturonate, calcium polygalacturonate, aluminum polygalacturonate, lead polygalacturonate and silver polygalacturonate, and recovering N-methylglucammonium polygalacturonate therefrom.

5. N - methylglucammonium polygalacturonate prepared according to the process described in claim 2.

6. N - methylglucammonium polygalacturonate prepared according to the method described in claim 3.

7. N - methylglucammonium polygalacturonate prepared according to the method described in claim 4.

References Cited by the Examiner

UNITED STATES PATENTS

| | | | |
|---|---|---|---|
| 2,520,123 | 4/1950 | Carson | 260—209.5 |
| 2,599,564 | 6/1952 | Lee | 260—209.5 |
| 2,697,059 | 12/1954 | Gustus | 167—65 |
| 2,774,710 | 12/1956 | Thompson | 167—55 |
| 2,878,252 | 4/1957 | Halpern | 167—55 XR |
| 3,017,325 | 1/1962 | Vogel | 167—58 |
| 3,061,512 | 10/1962 | Anderson | 167—58 |

LEON J. BERCOVITZ, *Primary Examiner.*

FRANK CACCIAPAGLIA, *Examiner.*

R. W. MULCAHY, S. ROSEN, *Assistant Examiners.*